Nov. 30, 1926. 1,608,825

C. F. WAGNER

FUSIBLE SEPARATOR FOR ELECTROPERCUSSIVE WELDING

Filed March 30, 1921

WITNESSES:
John W. Whiting
W. B. Jaspert.

INVENTOR
Charles F. Wagner.
BY
Wesley G. Carr,
ATTORNEY

Patented Nov. 30, 1926.

1,608,825

UNITED STATES PATENT OFFICE.

CHARLES F. WAGNER, OF PITTSBURGH, PENNSYLVANIA, ASSIGNOR TO WESTINGHOUSE ELECTRIC & MANUFACTURING COMPANY, A CORPORATION OF PENNSYLVANIA.

FUSIBLE SEPARATOR FOR ELECTROPERCUSSIVE WELDING.

Application filed March 30, 1921. Serial No. 456,828.

My invention relates to electro-percussive welding more especially to means for automatically controlling the arc formed between a pair of members or electrodes to be welded.

In Patent No. 1,066,468, to L. W. Chubb, issued July 8, 1913, and assigned to the Westinghouse Electric & Manufacturing Company, there is disclosed a method of percussively welding like or unlike metal bodies of relatively small diameters. As described in this patent, the ends of the bodies to be welded are pointed, and the bodies placed in contact with each other. An electric discharge is then passed through the bodies, fusing the pointed ends and causing an arc to be formed therebetween. A percussive blow is struck, causing the bodies to be forged together. The entire opertion consumes but a small part of a second.

When the electrodes are of relatively large cross-sectional area it is found that the arc produced by the melting of the tips is not of sufficient intensity to allow the engaging surfaces to become sufficiently fused prior to forging them together by percussive engagement.

It is among the objects of my invention to provide means for regulating the arc formed between two electrodes or metal members to be welded to fuse their surfaces evenly before forging.

It is another object of this invention to provide means for spacing the electrodes a suitable distance apart to cause arcing between them when welding current is passed through said electrodes.

In practising my invention, I provide a pair of superposed gripping members connected to a source of welding current. To each of said members I secure a supporting member or bracket. The upper bracket has a pair of adjustable screws fitted therein and the lower supporting member has a pair of coil springs which press upon seats adapted to engage said screws.

I provide a reduced end on one of the electrodes or members to be welded by machining or any other suitable means, or I may insert a fusible separator between the electrodes which are clamped in the gripping members. A relatively large current is passed therethrough, fusing away the reduced end or separator, allowing the upper member, which is weighted, to fall. The screws thereon contact with the spring seats mounted on the lower support, forcing the upper electrode away from the lower momentarily and producing an arc gap of a predetermined size between the two electrodes and establishing the arc. A percussive blow is then applied to the upper member, to forge the two electrodes together.

In the accompanying drawings, forming a part hereof and in which like reference characters designate like parts, Figure 1 is a side elevational view of an apparatus for electro-percussive welding showing the electrodes or members to be welded in place.

Figure 1:
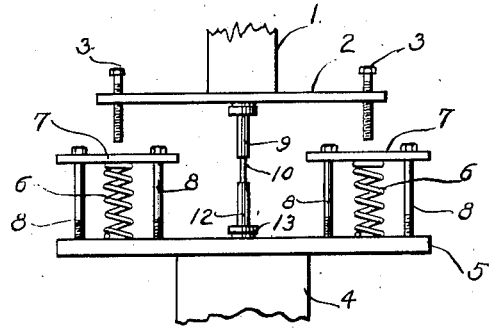
Figure 2:
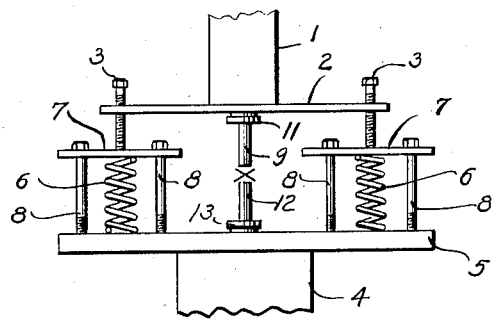
Fig. 2 is a similar view illustrating an intermediate stage of the welding.
Figure 3:
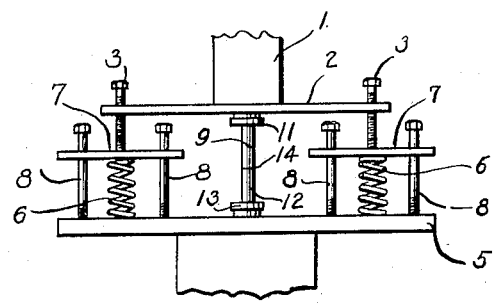
Fig. 3 is a similar view showing the final position of the two electrodes after forging.

I employ a ram 1, having secured to the lower end thereof a bracket 2 on which are fitted adjustable screws 3. A stationary member 4 having a supporting bracket 5 secured thereto is placed in perpendicular alinement with the upper member 1. A pair of helical springs are provided with a pair of seating members 7 which are held in fixed relation to the supporting bracket 5 by guide bolts 8.

It will be noted that the bottom ends of the adjustable screws 3 constitute an abutment surface which is normally separated from the spring means 6, 7, as indicated in Fig. 1, so as to be inoperative during the initial movement of the movable electrode. The separation between the abutment surface at the bottoms of the adjustable screws 3 and the top surface of the spring frame 7 may be adjusted either by turning the screws 3 or by turning the guide bolts 8 for the spring frame 7.

An electrode 9 having a reduced end portion 10 is secured to the ram 1 by a clamping member 11 and a similar electrode 12 of uniform cross-sectional area is secured to the member 4 by the clamping member 13 so that the ends of said members 9 and 12 are in contact with each other. In place of the reduced portion 10 I may employ a fusible separator of relatively small cross-sectional area between the members 9 and 12.

The gripping members 11 and 13 are connected to a source of welding current and a large momentary current is passed therethrough, fusing the member 10 and forming a gap between the members 9 and 12. This allows the ram 1 to fall towards the stationary member 4 until the screws 3 make contact with the seating members 7 which are so adjusted as to maintain a gap of predetermined length between the members 9 and 12, forming an arc between their adjacent surfaces. When these surfaces have become fused they are brought into intimate engagement by applying a percussive blow to the ram 1, thus forging the fused surfaces together into a homogeneous welded joint 14.

It is evident from the above description of my invention that my apparatus provides a simple means for forming welds of uniform quality in that the operation is entirely mechanical and automatic. According to the methods outlined in the prior art it was necessary to bring the welding electrodes into engagement and then separate them to form a welding arc.

Although I have described a specific embodiment of my invention it will be obvious to those skilled in the art that various modifications may be made in the details of construction thereof without departing from the principles herein set forth. For instance, I may provide a single member for adjusting the gap or arcing space between the electrodes in place of the supporting brackets by mounting a coil spring in the center of the apparatus or I may employ a circular spacing member having a plurality of springs inserted therebetween.

I claim as my invention:

1. A welding system comprising two electrodes movable relatively to each other, a fusible member separating said electrodes, means for securing a predetermined gap between the electrodes in the course of electrode travel and means for securing engagement between said electrodes.

2. A welding system comprising two electrodes movable relatively to each other, a conducting fusible member separating said electrodes, means for securing a predetermined gap between the electrodes in the course of electrode travel to maintain an arc between said electrodes and means for securing a percussive engagement between said electrodes.

3. A welding system comprising a pair of members to be welded movable relatively to each other, a fusible separator between said members and means for intercepting the movement of said members toward each other in the course of their travel.

4. A welding system comprising two electrodes movable relatively to each other separated by a fusible member extending from one of said electrodes, means for securing a predetermined gap between the electrodes in the course of electrode travel and means for securing percussive engagement between said electrodes.

5. A welding system comprising two electrodes separated from each other, a fusible member extending between said electrodes and providing an electrical connection between the same, means for causing movement of said electrodes, means for securing a predetermined gap between the electrodes in the course of electrode travel and means for securing percussive engagement between said electrodes.

6. A percussive welding apparatus comprising two electrode holders adapted to hold electrodes separated by a fusible member, one of said holders having an abutment surface, and a spring disposed between the other electrode holder and said abutment surface and normally separated from said abutment surface.

7. A percussive welding apparatus comprising two electrode holders adapted to hold electrodes separated by a fusible member, one of said holders having an abutment surface, a spring disposed between the other electrode holder and said abutment surface and normally separated from said abutment surface, and means for adjusting the distance of separation between said spring and said abutment surface.

8. A percussive welding apparatus comprising a stationary electrode, a movable electrode and supports therefor, characterized by the fact that a spring means is interposed therebetween and normally spaced from one of the members so as to be inoperative during the initial movement of said movable electrode.

9. A percussive welding apparatus for welding two electrodes, comprising means for yieldably pressing said electrodes toward each other, temporarily operative means for initially separating said electrodes in spaced relation, and means, operative only after the removal of said temporary separating means, for exerting a yieldable force opposing the approach of said electrodes.

In testimony whereof, I have hereunto subscribed my name this 23rd day of March, 1921.

CHARLES F. WAGNER.